United States Patent
Yu et al.

(10) Patent No.: US 10,852,821 B2
(45) Date of Patent: Dec. 1, 2020

(54) VIRTUAL RAY TRACING METHOD AND DYNAMIC LIGHT FIELD REFOCUSING DISPLAY SYSTEM

(71) Applicant: PLEX-VR DIGITAL TECHNOLOGY (SHANGHAI) CO., LTD., Shanghai (CN)

(72) Inventors: Qiming Yu, Shanghai (CN); Xuan Cao, Shanghai (CN)

(73) Assignee: PLEX-VR DIGITAL TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/346,942

(22) PCT Filed: Mar. 6, 2018

(86) PCT No.: PCT/CN2018/078098
§ 371 (c)(1),
(2) Date: May 2, 2019

(87) PCT Pub. No.: WO2018/161883
PCT Pub. Date: Sep. 13, 2018

(65) Prior Publication Data
US 2020/0057492 A1     Feb. 20, 2020

(30) Foreign Application Priority Data
Mar. 9, 2017   (CN) .......................... 2017 1 0137526

(51) Int. Cl.
*G06T 15/00*   (2011.01)
*G06F 3/01*    (2006.01)
(Continued)

(52) U.S. Cl.
CPC ......... *G06F 3/013* (2013.01); *G02B 27/0093* (2013.01); *G02B 30/34* (2020.01);
(Continued)

(58) Field of Classification Search
CPC ......... G06T 19/00; G06T 17/20; G06T 17/00; G06T 15/10; G05T 15/00
(Continued)

(56) References Cited

U.S. PATENT DOCUMENTS

| 2002/0013573 A1* | 1/2002 | Telfair ................... A61B 3/113 606/5 |
| 2010/0110069 A1* | 5/2010 | Yuan ....................... G06T 15/20 345/419 |

(Continued)

FOREIGN PATENT DOCUMENTS

| CN | 105144245 A | 12/2015 |
| CN | 106408643 A | 2/2017 |

(Continued)

OTHER PUBLICATIONS

International SearchReport on Patentability dated May 30, 2018, for corresponding International Patent Application No. PCT/CN2018/078098.

(Continued)

*Primary Examiner* — Gordon G Liu
(74) *Attorney, Agent, or Firm* — Winston Hsu (57) ABSTRACT

The present invention relates to a virtual ray tracing method and dynamic light field refocusing display system, ray information collection, or random retrieval for pixels on a full focus image, so as to reduce ray collection total; and/or simplifying cross point retrieval where an object surface is regarded smooth. The system includes a virtual reality content processor, a virtual reality monitor, an eyeball tracker, an eyeball tracing processor, and a ray refocusing processor. The present invention reduces computational complexity, enables automatic replacement of erroneous sampling, causes to achieve real and accurate refocusing. The present invention may enable dynamic refocusing along a gazing direction of the human eye, and enable focusing by (Continued)

a user to objects of variable distance, to be consistent with viewing characteristics of the human eye.

19 Claims, 8 Drawing Sheets

(51) Int. Cl.
    *G02B 30/34*     (2020.01)
    *G02B 27/00*     (2006.01)
    *G06F 1/16*     (2006.01)
    *G06T 7/20*     (2017.01)
    *G06T 15/06*     (2011.01)

(52) U.S. Cl.
    CPC ............... *G06F 1/163* (2013.01); *G06T 7/20* (2013.01); *G06T 15/06* (2013.01); *G06T 2207/30201* (2013.01)

(58) Field of Classification Search
    USPC ........................................................ 345/419
    See application file for complete search history.

(56) References Cited

U.S. PATENT DOCUMENTS

| | | | |
|---|---|---|---|
| 2011/0316968 A1* | 12/2011 | Taguchi .................... | G06T 5/50 348/36 |
| 2014/0320530 A1* | 10/2014 | Gruber, Jr. .............. | G06T 15/50 345/633 |
| 2016/0109706 A1* | 4/2016 | Schowengerdt ..... | G02B 3/0006 345/633 |

FOREIGN PATENT DOCUMENTS

| | | |
|---|---|---|
| CN | 107452031 A | 12/2017 |
| CN | 105812778 B | 2/2018 |

OTHER PUBLICATIONS

Written Opinion on Patentability dated May 30, 2018, for corresponding International Patent Application No. PCT/CN2018/078098.

\* cited by examiner

VIRTUAL RAY TRACING METHOD AND DYNAMIC LIGHT FIELD REFOCUSING DISPLAY SYSTEM

RELATED APPLICATION(S)

This application is a National Stage Application under 35 U.S.C. § 371 of PCT International Application No. PCT/CN2018/078098, filed Mar. 6, 2018, which claims the benefit of Chinese Patent Application Number CN 2017101375268, filed on Mar. 9, 2017, the entire contents thereof being incorporated herein by reference.

TECHNICAL FIELD

This invention relates to the technical area of image drawings, and in particular to virtual ray tracing method and dynamic light field refocusing display system.

BACKGROUND TECHNOLOGY

Ray tracing algorithm is a method emerged in 1980 of realistic image generation method, which can generate high quality realistic images, and is one of the regularly used algorithms for three-dimensional realistic images. Ray racing method is in effect an approximate reverse process of a physical lighting process, may trace specular reflection and rule reflection between objects, and simulates movement of ray on an ideal surface.

Figure 1A:
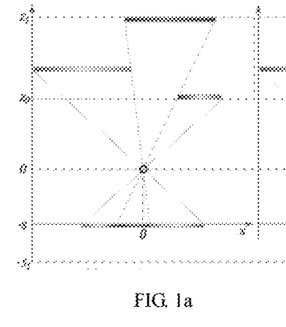
FIG. 1a depicts a schematic diagram showing the principle of small hole imaging.

Referring to FIG. 1a, FIG. 1a illustrates a ray tracing method of a small hole image and a depth map, where a depth range of a scene is $[z_0, z_1](z_1 > z_0 > 0)$, where $z_1$ may be infinite, and where the distance between a photosensitive sheet and a needle hole is s.

Figure 1B:
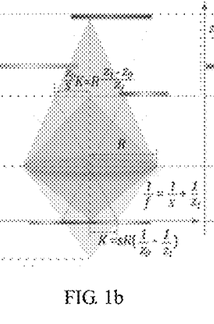
FIG. 1b depicts a schematic diagram of an imaging method via the use of a virtual thin lens.

Referring to FIG. 1b, and when a scene depth effect is rendered, a virtual thin lens is placed at the needle hole, the focal length of the virtual thin lens is f, and f satisfies the equation of $$\frac{1}{f} = \frac{1}{s} + \frac{1}{z_1},$$

in other words the farthest plane $z_1$ focuses on the photosensitive sheet. Further, if the thin lens is of a diameter of R, where in such a virtual image-formation system, points within the panel z will form blurry images on the photosensitive sheet, where the panel z is of the equation of $z \in [z_0, z_1]$, and where its diffuse circle is of the equation of:

$$k = sR\left(\frac{1}{z} - \frac{1}{z_1}\right) \quad (2)$$

According to equation (2), maximum diffuse circle radius of points on plane $z_0$ is of the equation $$K = sR\left(\frac{1}{z_0} - \frac{1}{z_1}\right),$$

where sizes or the diffuse circle radius are dependent on a circular intersection between the ray cone (such as the big cone of FIG. 1b) and plane $Z_0$. Referring back to FIG. 1b, and according to conversion rules of similar triangles, a convergence radius may be of the equation of $$R\frac{z_1 - z_0}{z_1} \text{ or } \frac{z_0}{s}K.$$

According to the above system and device, we can dynamically adjust the position $s_f$ of the photosensitive sheet to render an image which focuses onto plane $z_f$, where $z_f$ satisfies equation $1/s\_f + 1/z_f = 1/f$.

Figure 1C:
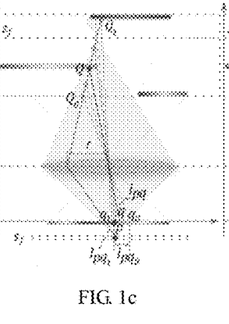
FIG. 1c depicts a schematic diagram showing ray tracing in an image space.

Referring to FIG. 1c, ray cone index of a central ray is calculated via the use of an original pixel index image. Accordingly a rendered image and the original image are of the same resolution, and a same pixel position correlates to the same position in a corresponding space.

Regarding a final image result, a final color of each pixel p is obtained via integrating all rays within a cone. In a traditional ray tracing algorithm, every ray is traced into a scene. However in a ray tracing algorithm of an image space, one ray is traced into a scene, then reversely traced back to the original image via a three-dimensional coordinate of the scene. According to Lanbson Hypothesis, the pixel color may be regarded as the ray color that has been reversely traced back.

To determine the color of the ray, positioning a cross point between the ray and an object within the space is necessary. In algorithm based on light field or ray field, ray tracing is generally obtained via forward bending, where a central view is obtained via bending peripheral light field view through the use of a depth map. A prerequisite to the use of such a method is that rays must be collected via dense sampling. Moreover, a great number of virtual angles need to be generated to render an image. Accordingly such algorithm is of high complexity. Therefore, there is a need to reducing algorithm complexity in ray tracing refocusing.

In addition, as a real-life application of ray tracing algorithm, current virtual reality devices can only show full focus images or full focus virtual reality scenes, which only reach contents along the positions of the head of an experimenting individual, and cannot provide contents that correspond to human eye imaging principle or contents that are of interest to the human eye, and therefore such device cannot perform refocusing according to the contents along the gazing direction of the human eye.

Figure 12:
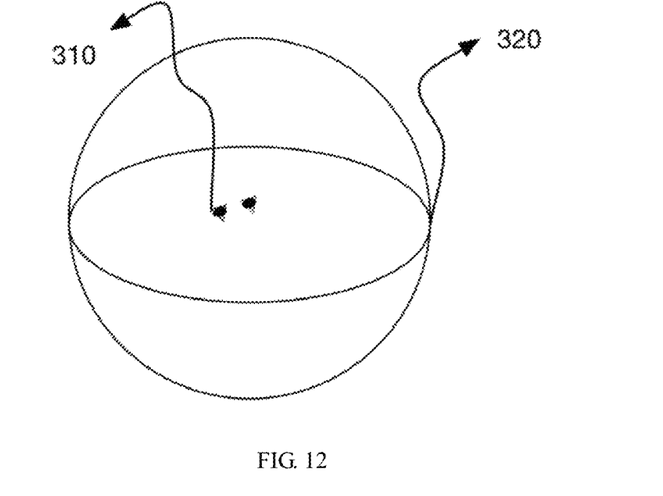
FIG. 12 depicts a schematic diagram of a single fixed focal plane.
Figure 13:
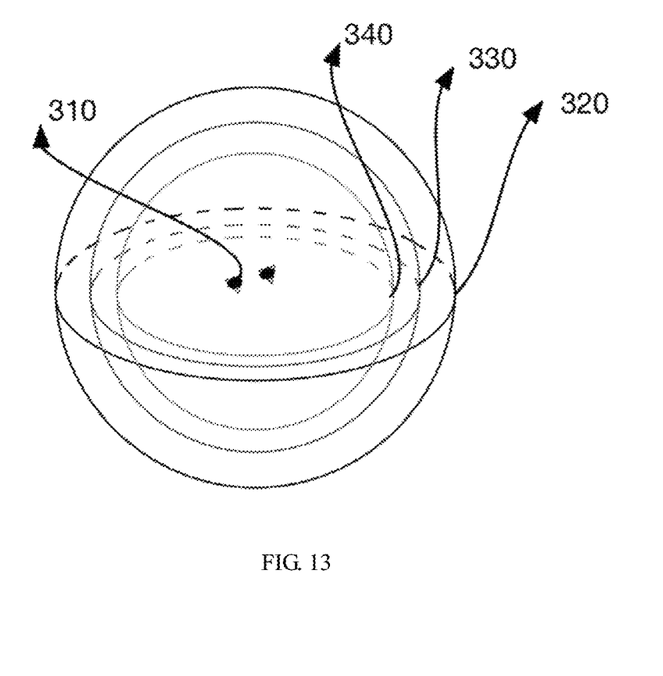
FIG. 13 depicts a schematic diagram of a multiple fixed focal plane.

Referring to FIG. 13, the ciliary muscle of a human eye 310 may contract and relax, such that the human eye 310 may focus onto objects of different distances. The human eye 310 may elect to focus onto spherical surfaces of different radius, where the ciliary muscle relaxes when the focusing is onto a more distant location (such as onto a spherical surface 320 with a relatively greater radius), and the ciliary muscle contracts when the focusing is onto a closer location (such as onto spherical surfaces of 340, 330 of relatively smaller radius). However because there is a lack of effective algorithm for the virtual reality devices, the human eye 310 can only see images of a full focal or fixed focal plane, such as the fixed focal plane shown in FIG. 12, such that refocusing is not obtainable, which does not comply with visual characteristics of the human eye 310 when viewing a three-dimensional world, and accordingly the visual experience of the human eye 310 in viewing the virtual reality is compromised. Therefore, in addition to the need for an algorithm that is of lesser complexity, there is also a need for a virtual reality display system where multiple fixed focal planes may be viewable via dynamic focusing along the gazing direction of a human eye.

SUMMARY

To solve existing problems, the present invention aims to provide a virtual ray tracing method and a dynamic light field refocusing display system.

A technical solution according to the present invention includes the following steps: obtaining a full focus image and its depth information; collecting ray information such that pixels on the full focus image are randomly searched to reduce ray sampling; and/or simplifying cross point search where an object surface is regarded smooth; and performing color fusion based on the ray information so sampled to obtain a final display result.

The ray sampling may be performed via vibration sampling, where a ray loop is divided into a number of equal parts, and one pixel is sampled out of each of the equal parts.

In the simplified crossing point search, $l_{pq}{}^t$ is computed according to $$l_{pq} = \frac{r}{R}K(d_f - d_q)$$

and a fixed $d_q$, rays within the radius r are sampled, $d_q{}^t$ is regarded as an initial offset of the pixel $l_{pq_0}$; the crossing point may be determined when the offset of the pixel $l_{pq}{}^t$ equals $l_{pq}{}^t$; if not, the offset of the pixel $l_{pq}{}^t$ is reset to $d_q{}^{(t+1)}$, and such iteration procedure is allowed to continue until $$\left|l_{pq} - \frac{r}{R}K(d_f - d_q)\right| \leq 1$$

is satisfied, and the color of the pixel at the end of the iteration procedure is reported back.

Another technical solution of the present invention provides a virtual reality dynamic light field refocusing display system, which includes a virtual reality content processor, virtual reality monitor, eyeball tracker to monitor eyeball movement direction, eyeball tracing processor, and light field refocusing processor to process dynamic light field refocusing, where, the virtual reality content processor obtains displayed content, and is in data connection with the virtual reality monitor, eyeball tracker, the eyeball tracing processor, and the light field refocusing processor, along this order. The virtual reality monitor includes imaging display panels corresponding to left and right eyes, an optical lens with magnification, and positioning sensors, among others, to display binocular stereo images obtained from the virtual reality content processor.

A micro LED light may be provided at an edge of the optical lens of the virtual reality monitor, and a camera head may also be provided above the optical lens.

Comparative to the existing technologies, algorithm complexity is reduced in the present invention via reduced ray sampling through random retrieval, and simplified cross point retrieval, where erroneous sampling may be automatically replaced so as to obtain real and accurate refocusing. In addition, the virtual reality dynamic light field display system may dynamically refocus according to the gazing direction of the human eye, where focus may be imparted onto objects of various distances, which in turn is consistent with the viewing characteristics of the human eye.

Referring to the drawings, a virtual reality content processor is shown at 100, a virtual reality monitor is shown at 200, an eyeball tracker is shown at 110, an eyeball tracing processor is shown at 120, a light field refocusing processor is shown at 130, a camera head is shown at 1101, a micro LED light is shown at 1102, an optical lens is shown at 2201, a human eye is shown at 310, an image display panel is shown at 2101, a human eye area image is shown at 2202, a left eye image is shown at 5101, and a right eye image is shown at 5102.

DETAILED DESCRIPTION

Description of the present invention is further made in connection with the drawings.

Different than traditional ray tracing algorithm, embodiment(s) of the present invention can deliver comparably the same effect via the mere use of a full focus image and its corresponding depth map, such that calculation is greatly simplified. In the following text, detailed description is provided to a virtual ray tracing algorithm that is comparable in effect to a single-lens reflex camera, via the presentation of priori probability and random retrieval algorithm.

In the real word, and in regards the human eye 310 viewing a three-dimensional space, the upper and lower rectus, the inner and outer rectus, and the upper and lower oblique may control the movement of the eyeball, so as to enable the human eye 310 to see scenes and targets of various directions. Existing virtual reality helmet cannot sense the position of a movement direction of the human eye, but may only determine a gazing direction of the human eye 310 through the determination of a movement of the human head via built-in or external sensors. However the human eye 310 is more flexible such that a gazing direction of the human eye 310 may not be in complete alignment with a direction of the head, such that accurate information of the gazing direction of the human eye cannot be obtained, and proper images are accordingly not obtainable.

Figure 9:
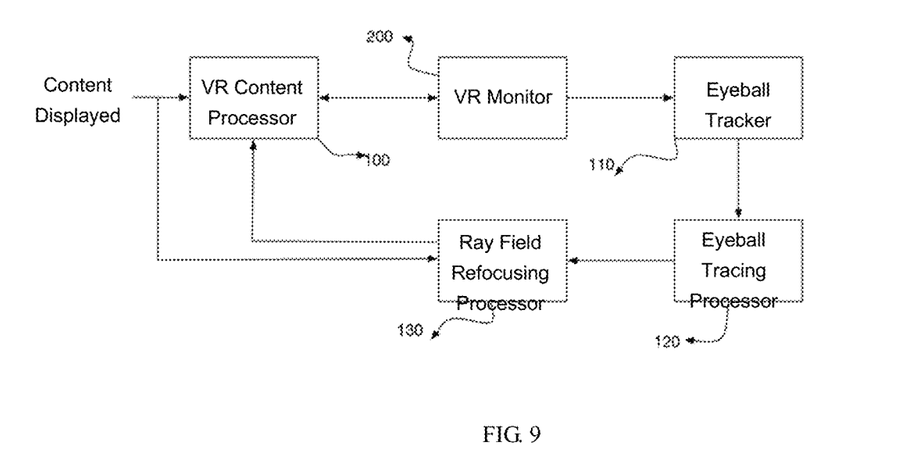
FIG. 9 depicts a schematic diagram of a virtual reality dynamic light field refocusing display system.
Figure 10:
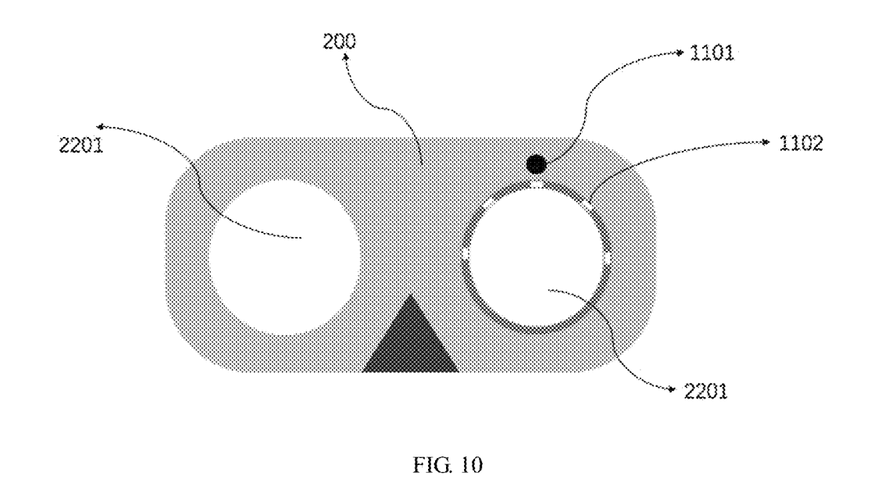
FIG. 10 depicts a schematic diagram of a virtual reality helmet.
Figure 11:
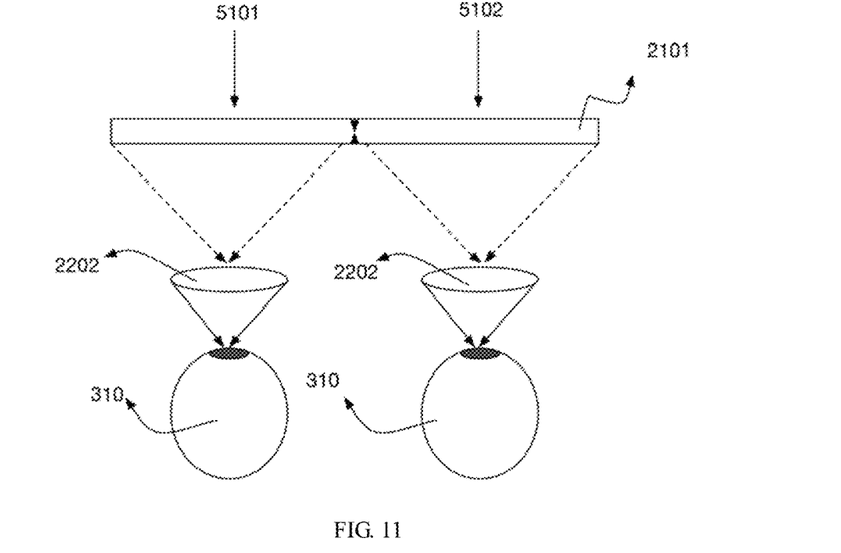
FIG. 11 depicts a schematic diagram of a virtual reality display monitor.

With reference to FIG. 9 through FIG. 11, and to solve the above-mentioned problems, provided according to embodiment(s) of the present invention is a virtual reality dynamic light field refocusing display system, which includes five modules, namely the virtual reality content processor 100, the virtual reality monitor 200 (such as virtual reality helmet, in particular HTC VIVE virtual reality helmet), the eyeball tracker 110 to obtain rotational direction of the eyeball, the eyeball tracing processor 120, and the light field refocusing processor 130 to process dynamic light field refocusing.

The virtual reality content processor 100 mainly employs the camera imaging principles according to computer visuals and transforms projection of the scenes from the content display to form two different images corresponding to the left and right eyes, with parallax between the images, so as to maintain stereoscopic information of the scenes on the displayed image.

Referring to FIG. 11 and FIG. 10, the virtual reality monitor 200 mainly includes the image display panel 2101, the optical lens 2201 with magnification capacity, and a positioning sensor such as a Gyro, so as to display a binocular stereoscopic image obtained from the virtual reality content processor. The micro LED light 1102 may be positioned at an edge of the optical lens 2201, and the camera head 1101 may be positioned above the optical lens 1102 to sample images of the human eye.

The eyeball tracker 110 that is to detect movement of the eyeball mainly employs the camera head 1101 of the virtual reality equipment to monitor movement of the human eye 310, samples in real time images of the eyeball, and transmits the images to the eyeball direction information processor 120.

The eyeball direction information processor 120 mainly obtains the movement information of the eyeball, which is also the direction of interest to the current experiencer and recorded as $O_{eye}$, via eyeball tracing technology and according to the eyeball area image 2202.

The viewing direction of the eyeball 310 may be used to determine the position of a crossing point P between an eyeball sight and the contents displayed from the display system (such as a displayed image), where depth information and hence the position of a focal plane may be obtained via the position information of the crossing point P. Thereafter virtual ray tracing algorithm may be used to obtain an image refocusing result relative to an area or a plane that is of interest to the human eye, and to impart a blurry effect to an area that is not of interest, so as to obtain a visual effect of the eyeball in a real world, and which is mostly executed through the use of the light field refocusing processor 130.

After being obtained from the light field refocusing processor 130, the displayed content is transmitted to the virtual reality content processor 100 for processing, and then binocular stereoscopic images of the scene are obtained, so as to eventually realize the virtual reality dynamic light field refocusing display.

According to a device embodiment of the present invention, movement information of the eyeball 310 may be detected, and according to the area of interest to the human eye 310, the displayed content is subject to dynamic light field refocusing processing, such that the displayed content is suitable to the eyeball's viewing principle, to more improved experience can then be delivered to the experiencer.

Based on an above-mentioned device embodiment(s), a method includes the following steps: obtaining a full focus image and its depth information; collecting ray information such that pixels on the full focus image are randomly retrieved to reduce ray sampling total; and/or simplifying crossing point retrieval where an object surface is regarded smooth; and performing color fusion based on the ray information as sampled to obtain a final display result.

Generally regarding the above-mentioned operation, crossing points may be determined along a ray scattering path, to determine whether every scattering depth z along the ray direction corresponds to a point in the space, where if the point does exist, such point may be reversely projected back to the image, and such pixel depth is regarded as z. If the ray stops at a location with a distance r to the center of the thin lens, a point Q exists along the ray direction with a depth of $z_Q \in (z_0, z_1)$, and further according to the principle of similar triangles, a distance of Q away from the central axis of the thin lens is $$r\frac{z_Q - z_f}{z_f}.$$

Therefore, the central pixel of the image is p, and Q has a projection point q relative to the image, a distance between p and q is expressed as $$l_{pq} = \frac{s}{z_Q} r \frac{z_Q - z_f}{z_f} = sr\left(\frac{1}{z_f} - \frac{1}{z_Q}\right).$$

Figure 1D:
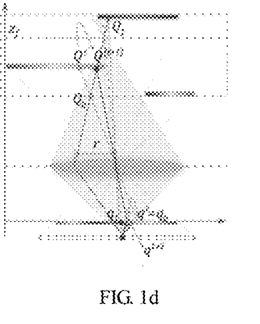
FIG. 1d depicts a schematic diagram according to one method of the present invention.

A depth range of the scene is $[z_0, z_1]$, and with reference to FIG. 1d, rays of different depths are projected onto the line $[q_0, q_1]$, where $q_0$ and $q_1$ are respectively the project points of $Q_0$ and $Q_1$, with depths being respectively $z_0, z_1$. In image ray tracing algorithm, we need to locate on the image the pixel q corresponding to the closest crossing point between the ray and the object in the space, where q is expressed as $q \in [q_0, q_1]$. If the closest crossing point is of a projection point of q, then q satisfies the equation:

$$l_{pq} = sr\left(\frac{1}{z_f} - \frac{1}{z_Q}\right). \quad (3)$$

where value of $z_q$ may be obtained from the depth map.

The above analysis is based on the depth information, and next the depth information is converted to offset amounts of the image pixels. According to relationship of similar triangles $$d = \frac{1}{z},$$

the offset amounts are normalized to [0, 1], where the offset amount 0 represents depth ∞, and 1 represents the closest depth. Via the use of a mask with the size of K(=sR), equation (3) may be simplified to:

$$l_{pq} = \frac{r}{R}K(d_f - d_q) \quad (4)$$

where $$d_f = \frac{1}{z_f}, d_q = \frac{1}{z_q}.$$

Both sides of the equation (4) may be determined according to the depth information, such that reconstruction of a three-dimensional model of the scene may be avoided via the employment of ray tracing of the image space.

In fact, such algorithm is of the complexity of O(NMK), where N represents the number of pixels entered into the image, M represents the number of pixels of the mask (M is consistent in size with the ray loop, and in other words, M is proportional to $K^2$), where K relates to detecting the closest crossing point. Different than ray tracing algorithm for three-dimensional models, ray tracing algorithm for images are presented with two main problems. It is assumed according to the embodiment that color image and depth image scatter into a two-dimensional planar space, and therefore even if equation (3) is met, it cannot be guaranteed that the ray intersects the object in the space. To alleviate this problem, the limitation is relaxed and the relaxed limitation is shown in equation:

$$\left|l_{pq} - \frac{r}{R}K(d_f - d_q)\right| \leq 1. \quad (5)$$

In other words, it is one pixel smaller. According to an embodiment of the present invention, only one color image is entered, blocked area of the scene (such as color and geometry) cannot be detected. A solution of the present invention is to assume the surface (geometry and texture) is symmetric relative to the center of the thin lens, and therefore if $l_{pq}$ is blocked, the pixel $-l_{pq}$ may be used in the embodiment.

The ray tracing of the image area according to embodiments of the present invention is similar to traditional ray tracing of a geometric space, with high computational complexity, particularly when used in the refocusing applications. As mentioned above, M is proportional to $K^2$, and therefore computational complexity increases with the radius as reflected in the equation (O(NMK)=O($NK^3$)). For big ray loops, computational complexity can be very high, and such that real time rendering may not be effected.

Figure 2:
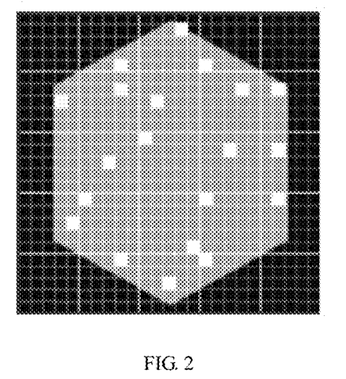
FIG. 2 depicts a schematic diagram showing vibration ray sampling.

In collecting ray information, M can be substantially decreased via the use of random sampling to reduce ray information sampling. With reference to FIG. 2, this embodiment uses vibration sampling, where in the first step, the ray loop is divided into a number of grids; and in the second step a pixel is randomly selected from each of the grids. If the grid is of a size that is $$\frac{1}{a}$$

of the size of the ray loop, computational complexity is then reduced to $$O\left(\frac{NMK}{a^2}\right).$$

Although vibration random sampling may guarantee the correctness of each sampled point, sparsity and randomness of the sampling delivers relatively good visual effect when the scene is relatively high in contrast and plentiful in color. Problems still may exist. Each grid should not be represented via only one ray; and more, random sampling cannot guarantee the quality of the ray sampled. Both scenarios may cause inconsistent level of blur between two adjacent pixels, so as to cause random noise.

According to another embodiment, the present invention further provides a process to simplify crossing point retrieval, where K is reduced via the assumption that the object in the space is of a smooth surface to expedite crossing point retrieval. When detecting the crossing point, it is not to determine whether each of the pixels q satisfies equation (4), but rather to compute $l_{pq}$ according to equation (4) and the constant value $d_q$. Referring to FIG. 1*d*, ray sampling within the radius r initializes $d_q^t$ (t is the number of iterations) which is regarded as the offset of the pixel $l_{pq_0}$. Every given $d_q^t$ can be used to compute $l_{pq}^t$, the position of the crossing point may be determined when the offset of the pixel $l_{pq}^t$ equals $l_{pq}^t$; if not, the offset of the pixel $l_{pq}^t$ is reset to $d_q^{(t+1)}$, and such procedure is allowed to continue until equation (5) is satisfied, and the color of the pixel at the end of the procedure continuation is reported back.

In real scenes, the object surface is often continuous and smooth, adjacent pixels are likely of the same depth, or $l_{pq}^t = d_q^{(t+1)}$, and therefore we may locate the crossing point with relatively fewer rounds of iterations.

Figure 3A:
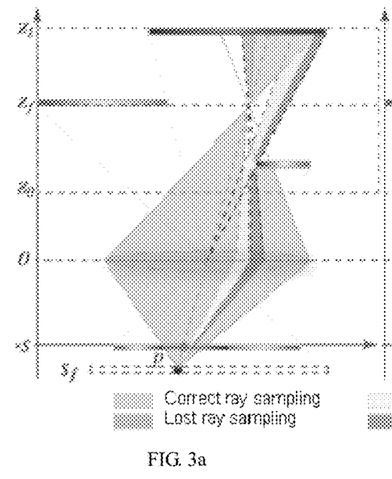
FIG. 3a and FIG. 3b depict schematic diagrams relating to erroneous ray sampling analysis.
Figure 3B:
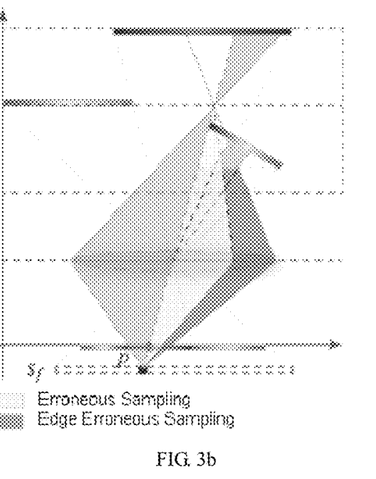

Referring to FIG. 3*a* and FIG. 3*b*, and furthermore, process may be expedited via random retrieval, where even though random retrieval of a single ray may not ensure the location of correct crossing points, error rate is very low, and this is because pixels with erroneous return may likely be a correct sampling of another ray; in other words, an erroneous sampling needs not be treated as abnormal, as it may still be a crossing point, which is effective for the ultimate refocusing rendering.

To improve focusing to a foreground object, and further the pixel q that has returned is presumed to be an erroneous crossing point, and the pixel q is of a depth that is farther away from p, in other words $d_p > d_q$, we then replace the color of q with the color of p. Therefore even though random crossing point retrieval may return with erroneous crossing point values, relatively accurate refocusing effect may still be obtained after fusion of all sampled rays, while the computational complexity is reduced to O(NM).

Referring to FIG. 3*a* and FIG. 3*b*, results of ray sampling according to a method of the present invention are shown, where correct and erroneous samplings are differentiated via the use of different color base. As mentioned earlier, erroneous sampling may be external to the fuzzy convolution kernel, and erroneous sampling is very rare in comparison to the entire ray sampling.

In real life photo shoot, conversion of linear scene radiation J to digital image intensity I is highly non-linear, due to high dynamic range compression. In single-lens reflex cameras such non-linear compression procedure may be represented via function f: I=f(J). The most ideal depth composite is J=$f^{-1}$(I), and the ultimate image I' may be obtained by $$I'(p) = g_p(I) = f\left(\frac{1}{|\Omega_p|}\sum_{q\in\Omega_p} f^{-1}(I(q))\right),$$

where p and q represent axis of the image, and $\Omega_p$ represents all conversions of convolution kernel $g_p(I)$ of the central point at p relative to the image.

Figure 5:
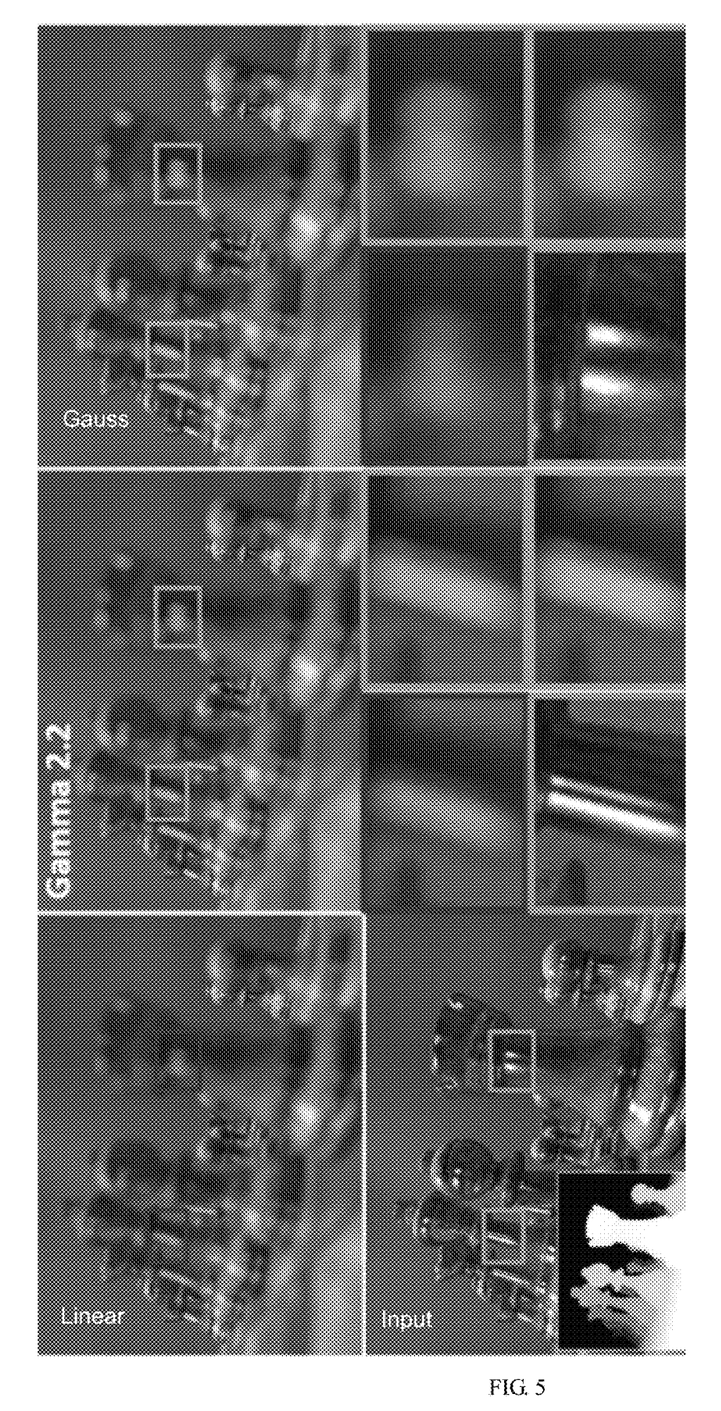
FIG. 5 depicts a schematic diagram showing the effect of various color fusion methods according to embodiment(s) of the present invention.

However there are two problems associated with direct computation of $g_p(I)$. For one, corresponding function of the input image is unknown, which is often approximated by a gamma color curve with parameter of 2.2; however there is difference between the corresponding function of the camera and the gamma 2.2. For two, a single corresponding function may not be enough to represent color treatment model. Referring to FIG. 5, and where results are from gamma 2.2 approximation, it is shown that color difference is present. To reduce color differentiation and non-linear effect, we obtain the pixel color of the image content via weighted integration.

Figure 4A:
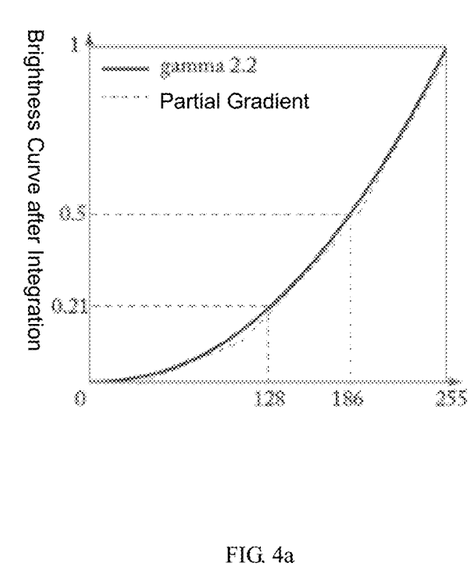
FIG. 4a depicts a gamma 2.2 curve and a gradient map.
Figure 4B:
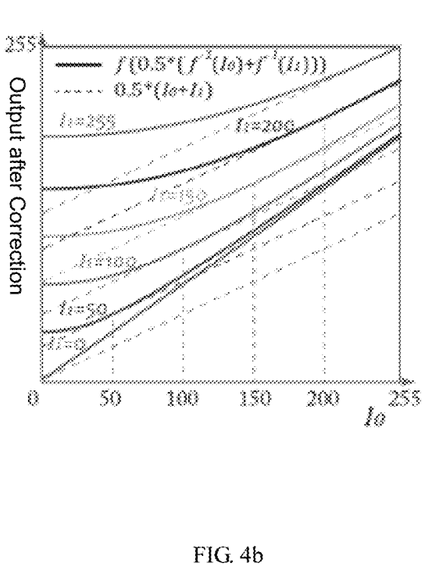
FIG. 4b depicts a schematic diagram showing image brightness correction via color tone mapping.

In this embodiment, gamma 2.2 function curve is used to approximate the characteristics corresponding to $g_p(I)$, and with reference to FIG. 4a, the curve is steeper at its high brightness area than the low brightness area, which means the high brightness area is more compressed. With reference to FIG. 4b, when fusing the high brightness and low brightness areas, gamma 2.2 curve may impart greater weight to the high brightness area. This embodiment uses the following equation for color fusion:

$$I'(p) = \frac{1}{W}\sum_{q\in k_p} w_q I(q), \ w_q = \exp\left(-\frac{(I(q)^{max} - 255)^2}{2\sigma^2}\right) \quad (6)$$

where $I(q)^{max} = \max\{I_r(q), I_g(q), I_b(q)\}$ represent the maximum value of the color path of the integrated pixel. $\Sigma_{q\in k_p} w_q$ and $\sigma$ may control appearance of color. FIG. 5 shows various methods of color fusion, where linear fusion is to directly obtain average from the integral domain, and gamma 2.2 may make color appear more in blue, and this embodiment preferably uses Gaussian weight color fusion, as its fusion effect is relatively more real.

Figure 6:
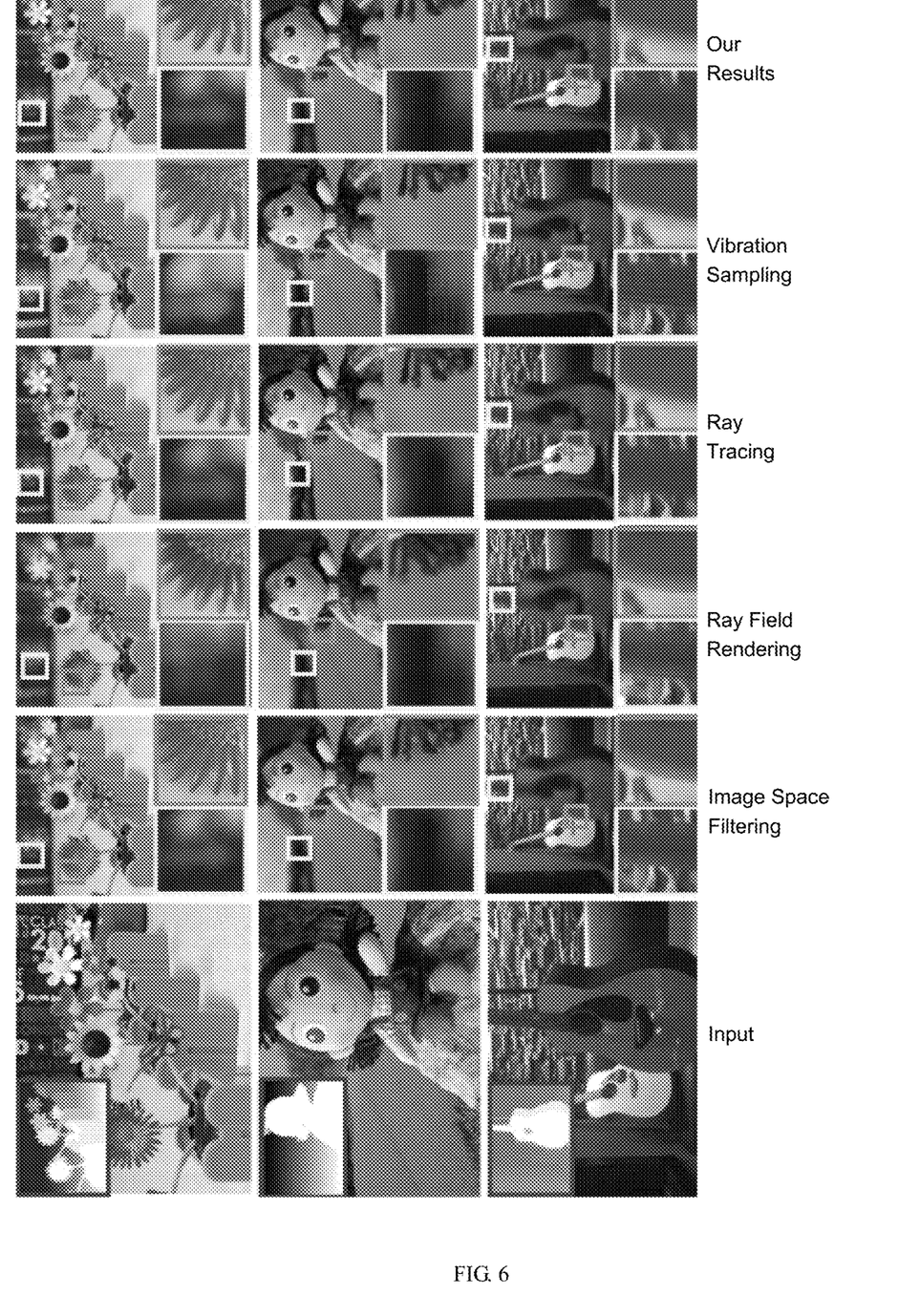
FIG. 6 depicts a schematic diagram showing a comparison of rendering effects.
Figure 7:
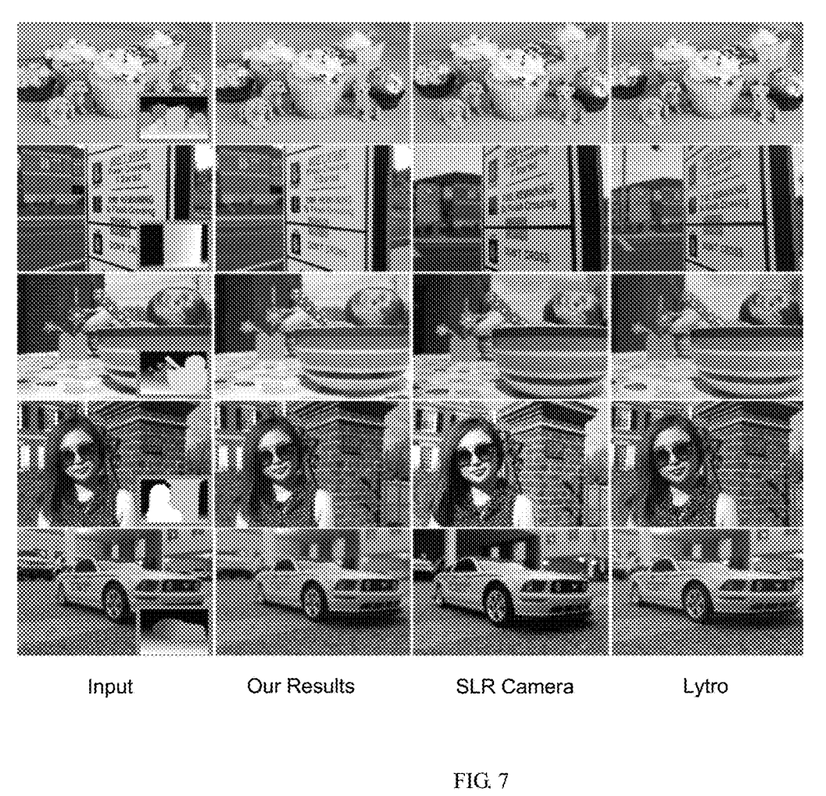
FIG. 7 depicts a comparative view of field depth effects between a single-lens reflex camera and a Lytro camera.
Figure 8:
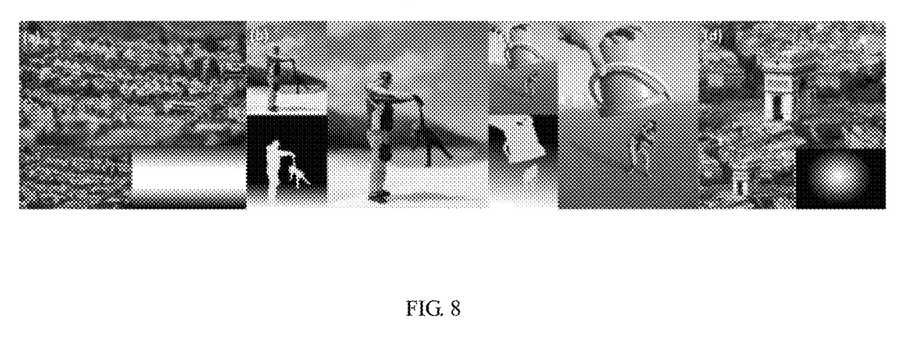
FIG. 8 depicts an effect diagram showing special focal effect rendered according to embodiment(s) of the present invention.

With reference to FIG. 7 and FIG. 6, this embodiment may result in field depth effect of comparatively higher quality, which reaches same in effect to the quality of single-lens reflective cameras and Lytro cameras, while this embodiment only uses regular mobile camera to obtain the same effect (this comparative benefit is also realized even when gray effects are concerned as shown in the drawings; same below). Referring to FIG. 8, the present invention may further be applied to Tilt-shift photo shoot, a technology which requires special focusing in a small scene. As may be seen from the four groups of comparative images of FIG. 8, Tilt-shift effect may be realized via a simple amendment of the depth map according to the present invention, while avoiding the use of special lens as otherwise needed in existing technologies. Therefore Tilt-shift effect can be easily simulated according to the present invention. Such process is similar to what is described above, and is therefore not repeated here.

Altogether, this embodiment reduces ray information sampling via random retrieval and simplifies crossing point retrieval, accordingly reduces computational complexity, and enables automatic replacement of erroneous sampling so as to obtain real and accurate refocusing. The virtual reality dynamic light field display system may enable dynamic refocusing along a gazing direction of the human eye, and to impart focusing on objects of different distances, so as to comply with viewing characteristics of the human eye.

The present invention is described in connection with the embodiments and the drawings. Structures referenced in the embodiments do not necessarily limit the present invention, and technical personnel skilled in the art may adjust as needed, and any modification and adjustment within the scope of the attached claims are within the scope of protection.

What is claimed is:

1. A virtual reality dynamic light field refocusing display system, comprising:
   a virtual reality content processor;
   a virtual reality monitor;
   an eyeball tracker to monitor eyeball movement direction by sampling real time images containing only eyeballs;
   an eyeball tracing processor; and
   a light field refocusing processor to process dynamic light field refocusing,
   wherein the virtual reality content processor is in data-line connection with at least one of the virtual reality monitor, the eyeball tracker, the eyeball tracing processor, and the light field refocusing processor;
   wherein the virtual reality dynamic light field refocusing display system is utilized for a virtual reality helmet.

2. The virtual reality dynamic light field refocusing display system of claim 1, wherein the virtual reality content processor is in data-line connection with the virtual reality monitor, the eyeball tracker, the eyeball tracing processor, and the light field refocusing processor, along this order.

3. The virtual reality dynamic light field refocusing display system of claim 1, wherein the virtual reality monitor includes at least one of a pair of imaging display panels corresponding to left and right eyes, an optical lens with magnification, and a positioning sensor, to display binocular stereo images obtained from the virtual reality content processor.

4. The virtual reality dynamic light field refocusing display system) of claim 1, wherein the virtual reality monitor includes a pair of imaging display panels corresponding to left and right eyes, an optical lens with magnification, and a positioning sensor, to display binocular stereo images obtained from the virtual reality content display processor.

5. The virtual reality dynamic light field refocusing display system of claim 4, wherein the virtual reality display monitor includes a micro light-emission-diode (LED) light positioned at an edge of the optical lens.

6. The virtual reality dynamic light field refocusing display system of claim 4, wherein the virtual reality monitor includes a camera head positioned above the optical lens to capture eyeball image.

7. The virtual reality dynamic light field refocusing display system of claim 1, wherein the virtual reality monitor includes a virtual reality helmet.

8. The virtual reality dynamic light field refocusing display system of claim 1, wherein the eyeball tracker is in eyeball image connection with the eyeball tracing processor.

9. The virtual reality dynamic light field refocusing display system of claim 1, wherein the light field refocusing processor is in direct data-line connection with the virtual reality content processor.

10. A virtual ray tracing method, comprising:
    providing a virtual reality dynamic light field refocusing display system which includes a virtual reality content processor, a virtual reality monitor, an eyeball tracker to monitor eyeball movement direction by sampling real time images containing only eyeballs, an eyeball tracing processor, and a light field refocusing processor to process dynamic light field refocusing, wherein the virtual reality content processor is in data-line connection with at least one of the virtual reality monitor, the eyeball tracker, the eyeball tracing processor, and the light field refocusing processor;

wherein the virtual reality dynamic light field refocusing display system is utilized for a virtual reality helmet.

11. The virtual ray tracing method of claim 10, wherein the virtual reality content processor is positioned to be in data-line connection with the virtual reality monitor, the eyeball tracker, the eyeball tracing processor, and the light field refocusing processor, along this order.

12. The virtual ray tracing method of claim 10, wherein the virtual reality monitor is provided to include at least one of a pair of imaging display panels corresponding to left and right eyes, an optical lens with magnification, and a positioning sensor, to display binocular stereo images obtained from the virtual reality content processor.

13. The virtual ray tracing method of claim 10, wherein the virtual reality monitor is provided to include a pair of imaging display panels corresponding to left and right eyes, an optical lens with magnification, and a positioning sensor, to display binocular stereo images obtained from the virtual reality content display processor.

14. The virtual ray tracing method of claim 10, wherein the virtual reality display monitor is provided to include a micro light-emission-diode (LED) light positioned at an edge of the optical lens.

15. The virtual ray tracing method of claim 10, wherein the virtual reality monitor is provided to include a camera head positioned above the optical lens to capture eyeball image.

16. A virtual ray tracing method, comprising:
obtaining a depth map of a full focus image;
retrieving ray information where fewer than all pixels of the full focus image are located which correspond to fewer than all rays sampled; and
performing color fusion based on the ray information to obtain an end display result;

wherein the step of retrieving ray information comprises vibration collection, where a ray loop is divided into a number of grids, and then one pixel is located from each of the grids and corresponding ray information of the one pixel is retrieved.

17. The virtual ray tracing method of claim 16, further comprising processing the ray information using a light field refocusing display system, the light field refocusing display system includes a virtual reality content processor, a virtual reality monitor, an eyeball tracker to monitor eyeball movement direction, an eyeball tracing processor, and a light field refocusing processor to process dynamic light field refocusing, wherein the virtual reality content processor is in data-line connection with at least one of the virtual reality monitor, the eyeball tracker, the eyeball tracing processor, and the light field refocusing processor.

18. The virtual ray tracing method of claim 16, further comprising treating an object surface as smooth to simplify retrieval of crossing points.

19. The virtual ray tracing method of claim 16, according to the simplified crossing point retrieval, $l_{pq}{}^t$ is computed according to $$l_{pq} = \frac{r}{R}K(d_f - d_q)$$

and a fixed $d_q$, rays within the radius r are sampled, $d_q{}^t$ is regarded as an initial offset of the pixel $l_{pq_0}$, wherein R is a diameter of a lens, K is a maximum diffuse circle radius, $l_{pq}$ is a distance between p and q, df, dq are depths off, q, respectively, the crossing point is determined when the offset $d_q{}^t$ of the pixel $l_{pq}{}^t$ equals $l_{pq}{}^t$, and if not, the offset of the pixel $l_{pq}{}^t$ is reset to $d_q{}^{(t+1)}$, such iteration continues until $$\left| l_{pq} - \frac{r}{R}K(d_f - d_q) \right| \leq 1$$

is satisfied, and the color of the pixel at the end of the iteration procedure is reported back.

* * * * *